Jan. 3, 1950  R. HASKINS, JR., ET AL  2,492,995
ERECTING MEANS FOR GYRO VERTICALS
Filed July 31, 1943  3 Sheets-Sheet 1

INVENTORS
R. HASKINS, JR.
C. E. BARKALOW
BY Herbert N. Thompson
THEIR ATTORNEY

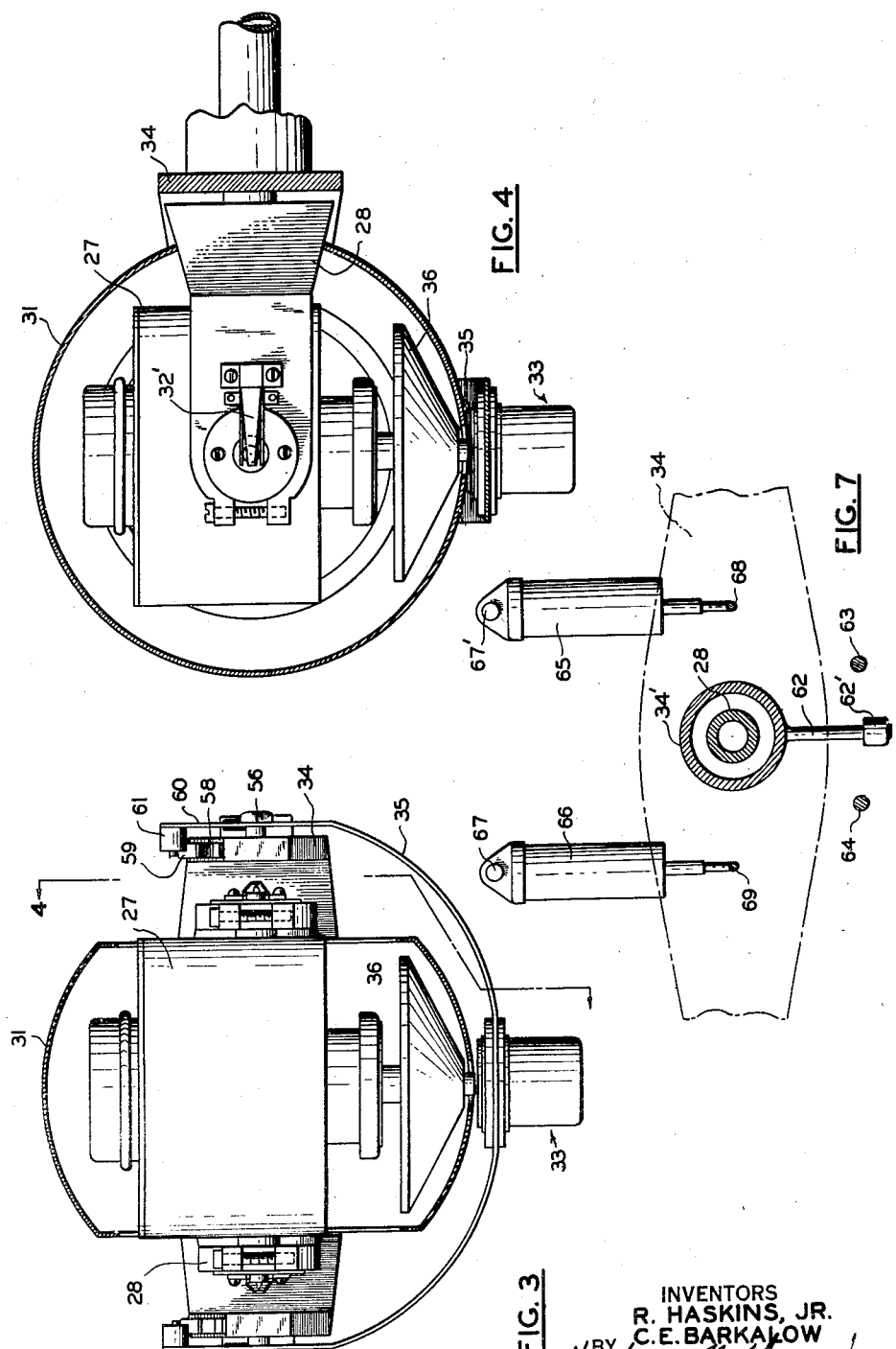

Jan. 3, 1950  R. HASKINS, JR., ET AL  2,492,995
ERECTING MEANS FOR GYRO VERTICALS
Filed July 31, 1943  3 Sheets-Sheet 3

INVENTORS
R. HASKINS JR.
C. E. BARKALOW
BY Herbert D. Thompson
THEIR ATTORNEY

Patented Jan. 3, 1950

2,492,995

UNITED STATES PATENT OFFICE 2,492,995

ERECTING MEANS FOR GYRO VERTICALS

Robert Haskins, Jr., Garden City, and Clare E. Barkalow, Floral Park, N. Y., assignors to The Sperry Corporation, a corporation of Delaware Application July 31, 1943, Serial No. 496,930

12 Claims. (Cl. 74—5.46)

The present invention relates generally to gyroscopic indicators for aircraft and has reference, more particularly, to an attitude indicating type of gyro vertical instrument and electromagnetic control means for maintaining the rotor spin axis in a truly vertical position. The invention is particularly concerned with a control means that produces erecting torques about both horizontal axes of the gyro rotor case to return it to its normal position, if displaced, the displacement being detected by the gyro-control means itself.

In accordance with the invention, erecting torques are exerted directly about the axes of the gyro rotor case by positioning a rotating symmetrically shaped conductor member in a magnetic field, the field defining a truly vertical reference axis.

One of the objects of this invention is to provide an erection controller for a gyroscopic attitude indicator with 360 degrees of freedom. Our invention has particular advantages over many other types of erectors when employed with this type of gyro vertical, especially with the type which is designed to maintain a slight forward inclination for the purpose and as disclosed in the copending application of F. D. Braddon, now Patent No. 2,409,659, dated October 22, 1946 for Gyroverticals.

A feature of the invention is to provide erecting means for an instrument of this character which includes a magnetic field radiator that defines a vertical reference axis and a rotating conductor mounted on the gyro rotor case that links the magnetic field, this combination producing torques about both horizontal axes of the gyro rotor case of the instrument in a direction that restores the case to an erected position.

Another object of the invention is to provide a torque exerting conductor which is so shaped that after initial displacement of the rotor case from an erected position, a substantially constant erecting torque will be exerted thereon.

A further feature of the invention is to provide means for effectively disabling the erection means upon the relative angle of tilt between the pendulous erection device and the craft exceeding a predetermined amount, under which condition the presence of an erection force would cause deviation rather than erection.

Another feature of the invention is to provide means for damping relative motion between the radiator of the erecting means and the casing of the instrument.

Other objects, features and structural details of the invention not at this time particularly enumerated will be understood from the following detailed description of the same.

An illustrative embodiment of the invention is shown in the accompanying drawings in which:

Fig. 3 is an end elevation view of the gyroscope viewed along line 3—3 of Fig. 2 showing the method of mounting the radiating means;

Fig. 4 is a side elevation partly in section of the gyro of our device viewed along line 4—4 of Fig. 3;

Fig. 7 is a sectional view of the gimbal arrangement shown in Fig. 6 and taken along line 7—7 thereof;

Similar characters of reference are employed in the above-described views to designate corresponding parts.

Figure 1:
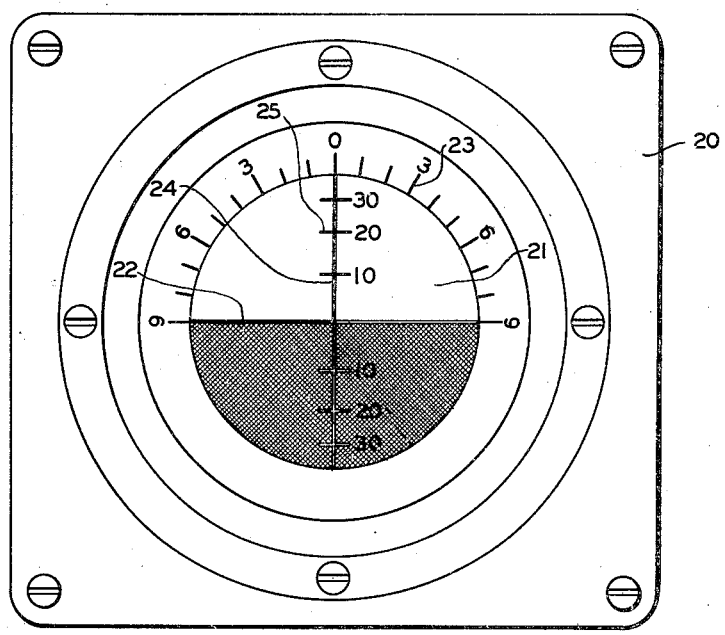
Fig. 1 is an elevational view of the gyro instrument of our invention as seen by the pilot.

Referring now to Fig. 1, a universally mounted gyro rotor case is shown that gives indications of the attitude of the craft on which it is employed, no matter what position in space the craft assumes. A more detailed disclosure of this character of instrument may be found in the copending application, now abandoned, of E. O. Esval, Walter Wrigley, and Robert Haskins, Jr., Serial No. 445,760, for Attitude gyro, filed June 4, 1942. The reference character 20 designates a casing which houses the mechanism of the instrument.

With reference to Fig. 1, indications are obtained from the instrument by means of an index wire 22 fixed to the casing and by a roll designating scale 23. The respective references for the index wire 22 and scale 23 are the 360° extending scale marks 25 and the meridian line 24.

Figure 2:
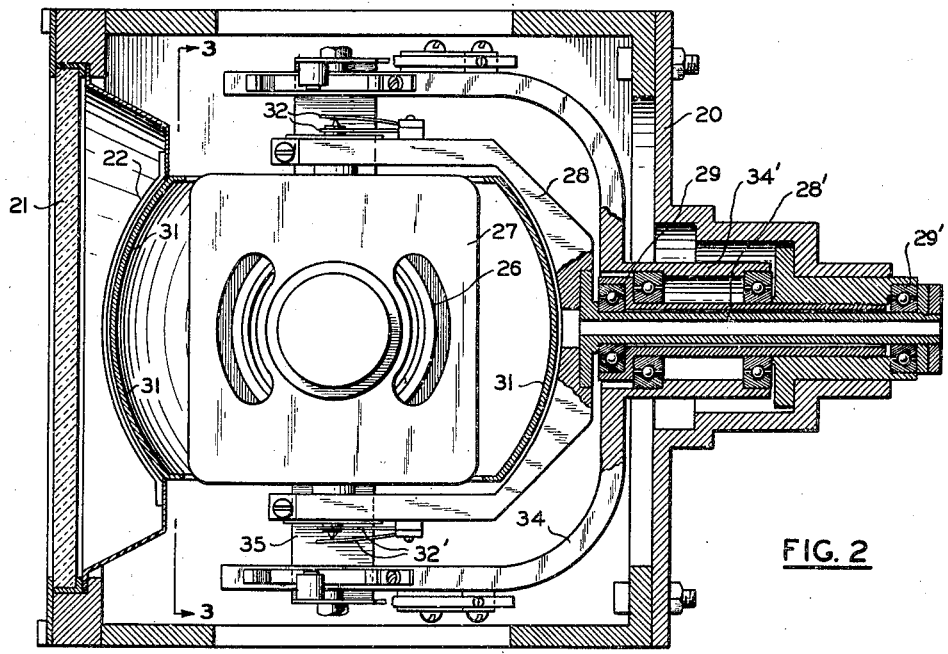
Fig. 2 is a horizontal cross-sectional view, partly in plan, showing the gyro mounted in its casing.

In Fig. 2, the gyro rotor 26 is mounted to spin about a normally vertical axis in a case 27 which in turn is mounted in a U-shaped gimbal ring 28, for pivotal movement about a minor axis. The gimbal ring 28 is pivotally mounted in the instrument casing 20 by an elongated trunnion arm 28' journalled in bearings 29 and 29' in the rear of the instrument. By this construction the whole front of the case 27 may be readily viewed through the window 21. The background or mask is formed by a non-magnetic shell 31 which completely surrounds the rotor case 27 and is rigidly fastened thereto so that the two move as a single unit. The gyro rotor may be electrically spun, and the electrical connections may be made in any suitable manner as by connectors 32, 32'. The operation of an instrument of this character is described in detail in the above-mentioned application.

The means for producing erecting torques about the axes of the gyro rotor case is clearly shown in the remainder of the figures. The erecting torque is produced by the interaction between a magnetic field radiator generally indicated at 33, mounted on a bail 35 which depends pendulously from a second or outer gimbal ring 34 (see Figs. 3 and 4), and a cup-shaped conductor 36 rigidly fastened to the gyro rotor. The outer gimbal 34 is pivotally mounted in coaxial relation to elongated trunnion 28' and is free to revolve about it. The combination of bail 35 and gimbal 34 provides an independent gimbal system that universally supports the magnetic field radiator 33 which produces a field that defines a vertical reference axis for the spinning gyro rotor.

Figure 11:
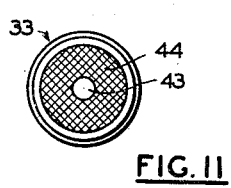
Fig. 11 is an elevational view of one form of radiator or field producing means.
Figure 12:
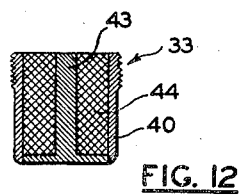
Fig. 12 is a sectional view of the radiator shown in Fig. 11.

The radiator 33 may be an ordinary permanent magnet or may be of the electromagnetic type shown in Figs. 11 and 12. As therein shown, the soft iron core 43 is surrounded by a winding 44 which forms a coil about the core 43. Energy from a suitable source (not shown) is passed through the coil to polarize the core 43. The casing 40 of the radiator is constructed of magnetically permeable material so that lines of flux move in a generally radial direction between the casing 40 and the core. Thus, it is evident that a vertical reference defining magnetic field is produced at the upper end of the radiator.

Figure 5:
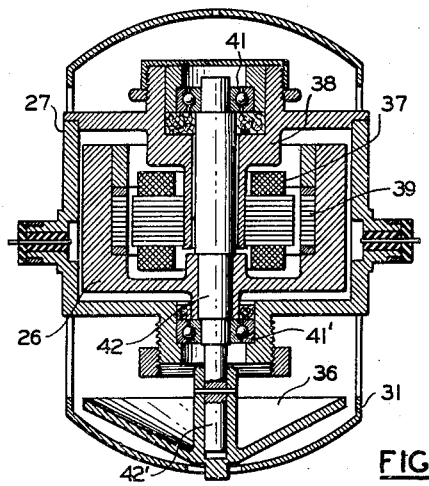
Fig. 5 is a detail sectional view of the gyro rotor case.
Figure 8:
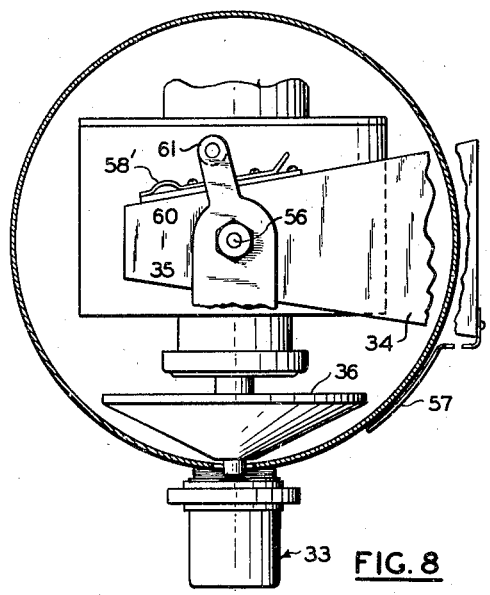
Fig. 8 is a side elevational view of the rotor case and outer gimbal.

It is well known that when a magnetic field is cut by a moving conductor, there are forces produced between the conductor and the magnetic field. In the present invention use is made of this fact for erecting the rotor case when it moves from its normal position. Referring now to Fig. 5, there is shown a detailed section of the gyro rotor and rotor case. As illustrated, the gyro rotor 26 is driven by a polyphase induction motor, the stator winding 37 of which is rigidly fastened to an internally projecting sleeve 38 of the rotor case 27. The inductive rotor 39 of the motor is mounted on the internal wall of the hollow gyro rotor 26. The gyro rotor is mounted to rotate in suitable bearings 41 and 41' located on gyro rotor case 27. As shown in Fig. 5, a generally conical cup-shaped conductor 36 is fastened to an extension 42' of the gyro rotor shaft 42. As shown in Fig. 8, the normal position of the erecting means is one in which the axis of symmetry of the conductor or spin axis of the gyro rotor is coincident with the reference axis defined by the radiator. Conductor 36 rotates at the speed of the gyro rotor. Conductor 36 is preferably made of a highly conductive material such as copper or aluminum, the same cutting the flux field of the radiator. When the gyro rotor spins on a truly vertical axis the conductor 36 is disposed at the center of the flux field of the radiator 33, there are no eddy currents induced in the conductor and hence no effective force is produced to move the conductor 36. However, if the rotor case tilts from this position, the conductor 36 is correspondingly angularly displaced with respect to the vertical reference axis provided by the radiator. By this movement the conductor moves outwardly from the center of the magnetic field and the flux field of the radiator induces eddy currents in the conductor so that a force is produced on the conductor that is effective about either of the axes of universal mounting of the rotor case, thereby causing the spin axis of the gyro rotor to return to a normal position.

In the erecting control of the character shown and described, the torque is obtained by relative rotation of the spinning conductor on the gyro rotor case and the field of the reference providing radiator. After initial angular displacement of the parts, it is necessary that the torque exerted by the conductor remain substantially constant within the range of displacement in which the parts are effective. The resultant torque force exerted on the rotating conductor is substantially proportional to its linear velocity. With increasing angular displacement of the parts unless special provision is provided to obtain a constant torque, the force of the torque would increase as displacement increases as more lines of flux of the radiator are cut per unit of time. In accordance with the provision of the present invention, the conductor is so shaped and disposed with respect to the radiator that the square of the total flux passing through the conductor and the magnitude of angular displacement therebetween vary in substantially inverse proportion. In the form of the invention shown in Fig. 3, the conductor 36 is conically shaped and includes a cylindrical projection at the apex of the same so that the total flux of the radiator affecting the conductor is varied by increasing the air gap between the parts as the magnitude of the displacement increases. In this arrangement as the displacement increases, the total flux in the conductor decreases so that the resultant torque substantially remains constant after initial angular displacement of the parts.

A gyroscopic instrument of the type disclosed in this and the above-mentioned application provides a 360° indication of the attitude of the craft. This is especially desirable in acrobatic flying and in military maneuvers.

Figure 6:
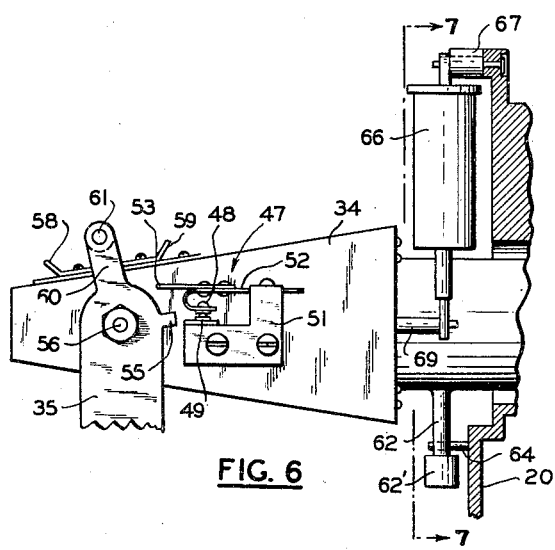
Fig. 6 is a detail view of the outer gimbal which supports the radiating means.

To disable the torque exerting means described during extreme conditions causing unusual relative angles between the pendulous erector and gyroscope or craft, such as a steep dive, reference is made to Fig. 6 which shows a switch 47 mounted on the gimbal ring 34 for the radiator. Switch 47 includes two normally closed contact members 48 and 49, and is in close proximity to the radiator supporting bail 35. Contact 49 is situated on a bracket 51 fastened to the gimbal ring 34 while contact 38 is resiliently fastened to the same bracket by spring 52.

Attached to the spring 52 is an extending portion 53 which engages a cooperating extension 55 on the radiator supporting bail 35. The radiator used in this embodiment of the invention is of the electromagnetic type as shown in Figs. 11 and 12. The switch 47 is connected in a series circuit which includes the radiator. When the switch is opened the circuit to the radiator is broken thereby rendering the torque exerting means ineffective.

The extension 55 is effective to open the switch 47 when angular displacement of bail 35 and ring 34 occurs that is approximately equivalent to the craft diving in excess of an angle of 25° from the horizontal. The axis of the bail 35 on ring 34 is indicated at 56. No switch to disable the radiator under other conditions causing extreme relative tilt of the craft and pendulum, such as a steep climb or bank, is shown herein, but it is obvious that a limit switch may be provided for such conditions if desired. A modified form of disabling means is shown in Fig. 8 in which a shield 57, in this instance, is mounted on the ring 34, the same being positioned to come between the conductor and radiator to interrupt the flux linkage of the parts of the erecting means. It will be understood that when the radiator and conductor are angularly displaced beyond these operating limits, the erecting means is ineffective.

Means are also provided for limiting the movement of the pendulous radiator with respect to casing 20 without interfering with the free gyro instrument. In this connection, Fig. 6 shows a limit arm 61 for the bail 35 that cooperates with the spaced stops 58 and 59, mounted on the gimbal ring 34. In the form of the invention shown in Fig. 8, limit stop 58 is provided by a spring 58'. When sufficient displacement about the pitch or athwartship axis of the craft occurs to bring limit arm 61 in contact with spring stop 58', the flux linking the conductor is blocked by the shield 57. Any attractive force between the shield and radiator is overcome by the force stored in the spring 58' which is effective to insure that the radiator returns to a normal position.

Figs. 6 and 7 show a further means for limiting the universally mounted radiator about the fore and aft axis of the same. This means includes a rod 62 mounted on the trunnion 34' of the gimbal ring 34. A rubber or felt bumper 62' is fixed to the rod 62, the same cooperating with two limit pins 63 and 64 that extend inwardly from the wall of the casing 20. Damping means such as dashpots 65 and 66 are employed to connect the instrument casing and the gimbal mounting for the radiator 33. The pistons of the dashpots 65 and 66 are respectively pivotally connected to the gimbal ring 34 by means of pins 68 and 69. The casings of the dashpots are mounted on the casing by way of the pivotal connections 67 and 67'.

Figure 9:
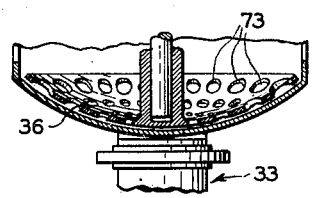
Fig. 9 is a view showing a modification of the conductor of the erecting means.
Figure 10:
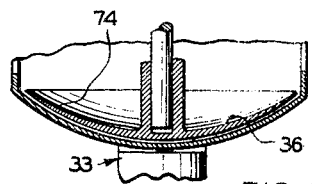
Fig. 10 is a view showing still another modification of the conductor.

Modified forms of the conductor 36 are shown in Figs. 9 and 10. In Fig. 9, the total flux of the radiator passing through the conductor is varied by perforating the conductor to effectively maintain a constant flow of eddy currents therein. This is accomplished by the widening perforations 73 in the wall of the conductor. The cup-shaped conductor 36, in this instance, is spherical in shape and the air gap between the same and the radiator is constant within the range of effectiveness of the erecting means. The perforations tend to limit the eddy currents set up in the inductor for increased displacement.

In Fig. 10, the conductor 36 is taperingly shaped to increase the resistance of the eddy current circuits in the conductor by decreasing the thickness of the conductor from the center to the periphery thereof as indicated at 74.

As many changes could be made in the above construction and many apparently widely different embodiments of this invention could be made without department from the scope thereof, it is intended that all matter contained in the above description or shown in the accompanying drawings shall be interpreted as illustrative and not in a limiting sense.

What is claimed is:

1. Means for exerting and erecting torque about the axes of universal mountings of the rotor case of a gyro vertical comprising a radiator of magnetic energy pendulously mounted on a separate universal support to provide a reference axis for the rotor case, a conductor linking the flux of the radiator mounted for movement with the rotor case, means for spinning said conductor about an axis normally coincident with the reference axis of the radiator, said conductor being symmetrically shaped and so disposed with respect to the radiator that the square of the total flux passing through the conductor and the magnitude of angular displacement therebetween vary in substantially inverse proportion.

2. Torque exerting means of the character claimed in claim 1, in which the total flux of the radiator passing through the conductor is varied by increasing the air gap between the same as the magnitude of the displacement thereof increases.

3. Torque exerting means of the character claimed in claim 1, in which the conductor decreases in thickness from the center to the periphery thereof to effectively increase the resistance of the eddy current circuits therein as displacement occurs.

4. Torque exerting means of the character claimed in claim 1, in which the total flux of the radiator passing through the conductor is varied by perforating the conductor to effectively maintain a constant flow of eddy currents therein as displacement occurs.

5. A torque exerting means for gyro verticals having a universally mounted rotor bearing case, a substantially conical, cup-shaped conductor having a cylindrical projection at the apex thereof mounted for movement with the case, means for spinning the conductor about the axis of symmetry thereof, a radiator of magnetic energy pendulously supported on a universal mounting separate from that of the case but whose point of axial intersection is coincident with that of the universally mounted rotor bearing case, said radiator providing a reference axis for the rotor case that is normally coincident with the spin axis of the conductor, the conical conductor being so disposed with relation to the radiator that, upon relative displacement thereof, the air gap therebetween increases as the magnitude of the displacement increases.

6. A torque exerting means for gyro verticals having a universally mounted rotor bearing case, a shell-shaped conductor in the form of a substantially spherical segment whose thickness decreases from the center to the periphery thereof, means for spinning the conductor about the axis of symmetry thereof, a radiator of magnetic energy pendulously supported on a universal mounting separate from that of the case but whose point of axial intersection is coincident with that of the universally mounted rotor bearing case, said radiator providing a reference axis for the rotor case that is normally coincident with the spin axis of the conductor, the shell-shaped conductor being so disposed with relation to the radiator that, upon relative displacement thereof, the thickness of the conductor decreases as the magnitude of the displacement increases.

7. A torque exerting means for gyro verticals having a universally mounted rotor bearing case, a cup-shaped conductor in the form of a substantially spherical segment whose wall is perforated, means for spinning the conductor about the axis of symmetry thereof, a radiator of magnetic energy pendulously supported on a universal mounting separate from that of the case but whose point of axial intersection is coincident with that of the universally mounted rotor bearing case, said radiator providing a reference axis for the rotor case that is normally coincident with the spin axis of the conductor, the perforated conductor being so disposed with relation to the radiator that, upon relative displacement thereof, the flow of eddy currents in the conductor is maintained substantially constant as the displacement increases.

8. A gyro vertical having a casing, a universally mounted rotor bearing case in said casing, erection controlling torque means therefor including a symmetrical cup-shaped conductor mounted for movement with the case, means for spinning the conductor about the axis of symmetry thereof, a radiator of magnetic energy for said conductor, a universal mounting for the radiator on which the same is pendulously supported within the casing, normally ineffective stop means for limiting the movement of the radiator relative to the casing, and means for disabling said radiator when said stop means is effective.

9. A gyro vertical having a casing, a universally mounted rotor bearing case in said casing, erection controlling torque means therefor including a symmetrical cup-shaped conductor mounted for movement with the case, means for spinning the conductor about the axis of symmetry thereof, an electromagnetic radiator of energy for said conductor, a universal mounting for the radiator on which the same is pendulously supported within the casing, switch means normally ineffective to disable said electromagnetic radiator, and means for rendering said switch means effective to disable said radiator.

10. A gyro vertical having a casing, a universally mounted rotor bearing case in said casing, erection controlling torque means therefor including a symmetrical cup-shaped conductor mounted for movement with the case, means for spinning the conductor about the axis of symmetry thereof, a radiator of magnetic energy for said conductor, a universal mounting for the radiator on which the same is pendulously supported within the casing, and normally ineffective shielding means fixed to one of the elements of universal mounting for the radiator, said shielding means being movable relative to the radiator to a position in which the same effectively blocks the field linkage of the radiator and conductor.

11. A gyro vertical having a casing, a universally mounted rotor bearing case in said casing, erection controlling torque means therefor including a symmetrical cup-shaped conductor mounted for movement with the case, means for spinning the conductor about the axis of symmetry thereof, an electromagnetic radiator of energy for said conductor, a universal mounting for the radiator on which the same is pendulously supported within the casing, normally ineffective switch means for disabling said electromagnetic radiator, stop means on the mounting for the radiator for limiting the movement of the radiator relative to the casing, and means for rendering said switch means effective when said stop means limits the movement of the radiator.

12. A gyro vertical having a casing, a rotor bearing case, a first gimbal universally mounting said case in said casing, erection controlling torque means therefor including a symmetrical cup-shaped conductor mounted for movement with the case, means for spinning the conductor about the axis of symmetry thereof, a radiator of magnetic energy for said conductor, a second gimbal mounting on which the radiator is pendulously supported within the casing, a stop on said second gimbal mounting for limiting the movement of the radiator relative to the casing, and a device connecting the casing and second gimbal mounting for damping the permitted relative movement of the radiator and casing.

ROBERT HASKINS, Jr.
CLARE E. BARKALOW.

REFERENCES CITED

The following references are of record in the file of this patent:

UNITED STATES PATENTS

| Number | Name | Date |
| --- | --- | --- |
| 2,167,422 | Lauggasser | July 25, 1939 |
| 2,229,645 | Esval et al | Jan. 28, 1941 |
| 2,365,727 | Pike | Dec. 26, 1944 |